Jan. 31, 1961   L. J. HIBBARD   2,970,250
HIGH-SPEED ELECTRIC-CAR CONTROL
Filed July 31, 1957   5 Sheets-Sheet 1
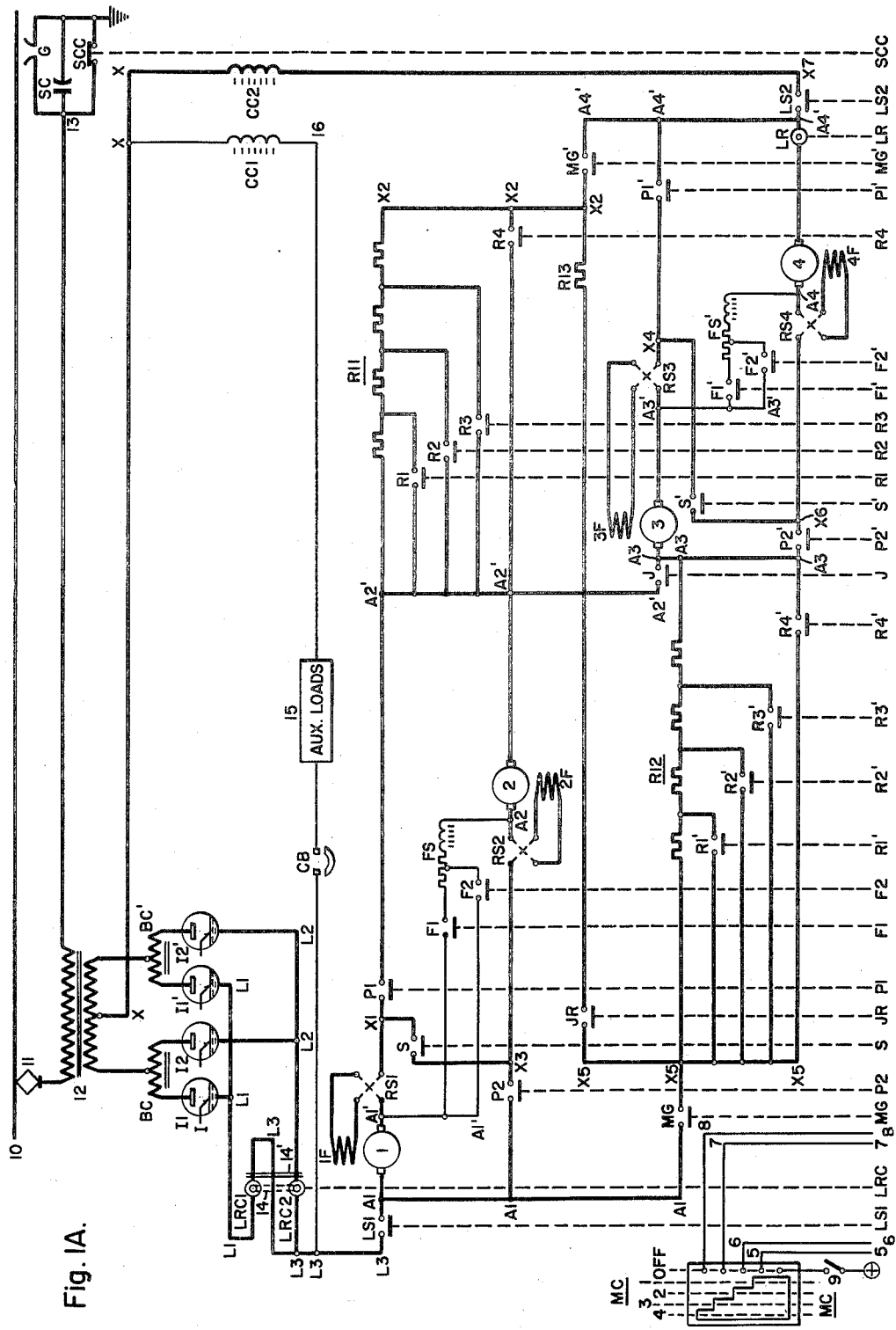
Fig. IA.

Jan. 31, 1961
L. J. HIBBARD
2,970,250
HIGH-SPEED ELECTRIC-CAR CONTROL
Filed July 31, 1957
5 Sheets-Sheet 4
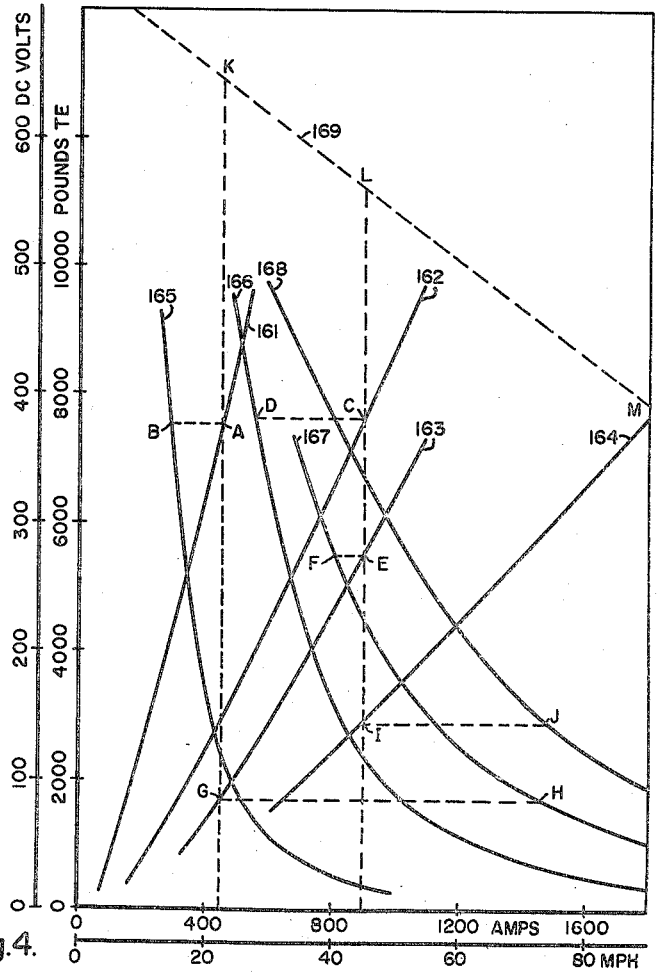
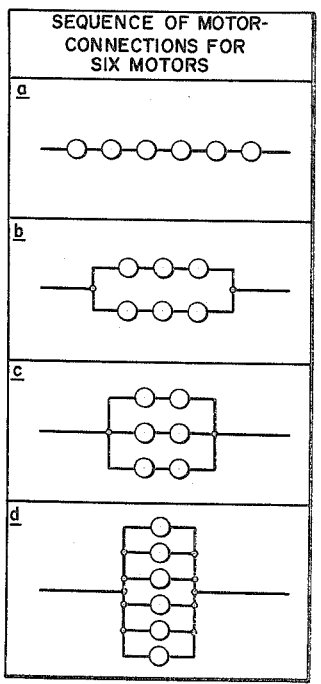
Fig.2.
Fig.3.
Fig.4.

United States Patent Office 2,970,250
Patented Jan. 31, 1961

2,970,250

HIGH-SPEED ELECTRIC-CAR CONTROL

Lloyd J. Hibbard, Forest Hills, Pa., assignor to Westinghouse Electric Corporation, East Pittsburgh, Pa., a corporation of Pennsylvania Filed July 31, 1957, Ser. No. 675,481

12 Claims. (Cl. 318—90)

My invention relates to electric railway cars which are adapted to be driven at high speeds for long distances, over tracks having tangent sections which are of sufficient length to make possible the attainment of a high speed before it is necessary to brake for either a stop or a restricted-speed zone such as a curve. My invention has particular relation to cars (including locomotives) which derive their power from a trolley (or third rail) having a more or less fixed voltage. Since the best all-around long-distance power-transmitting system for railroads is a high-voltage single-phase trolley, and since the best traction-motor is a series direct-current motor, my invention is primarily adapted for use in a rectifier-powered car, in which the single-phase high-voltage power-supply is stepped down in voltage, by a transformer which is carried by the car, and in which rectifiers are used for converting the secondary output of the transformer into direct current for energizing the traction-motors which are used to propel the car.

My invention has more particular relation to a car having an even number of traction-motors, not less than four motors. The principal feature of my invention is to use at least three sequential motor-combinations, starting out with all motors in series, then reconnecting the motors in one or more series-parallel combinations, depending upon the number of motors and finally (generally) again reconnecting the motors so that they are all in parallel. Throughout the acceleration of the motors, the effective voltage across the terminals of each of the motors is varied by suitable means, such as voltage-taps on the transformer or serially connected accelerating-resistances, both of which control-schemes are known, per se. In any one or more of the motor-combinations, after all of the accelerating-resistance has been cut out, (or after maximum-voltage conditions have been reached in the motors), one or more steps of shunted-field operation may be used, as may be advantageous. As is well known in railway-equipment, the various motor-accelerating steps are under the control of one or more limit-relays, so that the motorman may advance his controller rapidly to its full position, or to any other selected running position, leaving the limit-relay to automatically advance the control to match the armature-current for which the limit-relay is adjusted.

There are various practical reasons which usually make it desirable to change the limit-relay setting, when the highest-speed parallel-motor operation is reached, and sometimes also when an intermediate motor-combination is reached. The same limitation may not be the controlling limitation which necessitates a reduction in the current-setting of the limit-relay in every case; sometimes the limit may be reached by the overheating of the transformer, when too rapid an accelerating-schedule is being maintained; sometimes it is the rectifier capacity which imposes a limit on the permissible current per motor, as more and more motors are connected in parallel, in the different successive motor-combinations, so that there may be an unacceptably large number of rectifier arc-backs if the current is not reduced; sometimes the commutation-limit of the motors may be approached too closely at high speeds and heavy currents, resulting in quick deterioration of brushes and commutators; and sometimes there may be other considerations which make it desirable to reduce the setting of the limit-relay when the highest-speed motor-combination is reached, and sometimes also when the penultimate motor-combination is reached.

According to one feature of my invention, therefore, I provide means for automatically reducing the limit-relay setting, either when the transition is being made to the last motor-combination or when the last step of the preceding motor-combination has been reached, so that said preceding motor-combination will not be left until the motor-current has subsided, or at least partially subsided, to the value which is to be maintained during the last motor-combination.

In certain situations, it may not be necessary to reduce the limit-relay setting during any normal operating-conditions, either because the transformer-limits, the rectifier-limits and the commutation-limits are all high enough to be able to stand the operation in the highest-speed motor-combination, or because these parts can be readily enlarged or modified so that they are able to withstand the highest-speed motor-operation without curtailment of the limiting armature-current in each motor.

In the rectifier-power assembly which I prefer to use, there are two pairs of rectifiers in parallel, in a full-wave mid-tap rectifier-connection, so that the total current per car is being divided, at all times, between two rectifiers. A rectifier-failure is very rare, but it can happen, either as a result of a dead firing-circuit, or the breaking-off of an ignitor when ignitrons are used as the rectifiers, or for other causes, and when a rectifier fails, it must be safeguarded against. It is a feature of my invention, in cases where two or more rectifiers are dividing the total car-current between them, in parallel, to provide a means for automatically responding to a rectifier-failure, and for thereupon making the necessary limit-relay setting-change, when operating in one or more of the higher-speed motor-combinations, so as not to cause a failure of the remaining rectifiers.

Another feature of my invention relates to the use of a series capacitor, in series with the primary winding of the transformer on the car, for the purpose of giving a final speed-increment to the motors, after all of the accelerating resistance has been cut out, when the motors are operating all in parallel. This series-capacitor step may be considered also as being symbolic of any additional step which would make the parallel-operated motors run still faster.

There are a great many interlocking considerations, bearing on my invention, and it is believed best to defer further discussion of the same until some of the circuit-connections have been described and explained, or even until the operational advantages have been summarized at the end of this specification.

An exemplary form of embodiment of my invention is shown in the accompanying drawings which are intended to serve as a basis for a further explanation and discussion of my invention. In the drawings, Figs. 1A, 1B and 1C together constitute a very much simplified diagrammatic view of only the bare essentials of the apparatus which is needed to explain my invention and its operation, omitting a great many features which are known to be necessary on rectifier-powered railway-equipment, such as speed-control, overspeed trips and speed indicators for the car, anode breakers, overload breakers, various interlocking control-features for the electrical equipment, etc.

Fig. 2 is a sequence chart for the control of the four-motored car which is shown in Figs. 1A to 1C, with the operation-selector switches SW to SW3 in the positions in which they are illustrated.

Fig. 3 is a modified part of the sequence chart, showing the sequence of motor-connections for six motors.

Fig. 4 is a curve diagram for the tractive effort (TE) of the motor-connections shown in Figs. 1 and 2, omitting the partially shunted field-connections, and adding a voltage-regulator curve for the rectifier voltage.

Figure 1B:
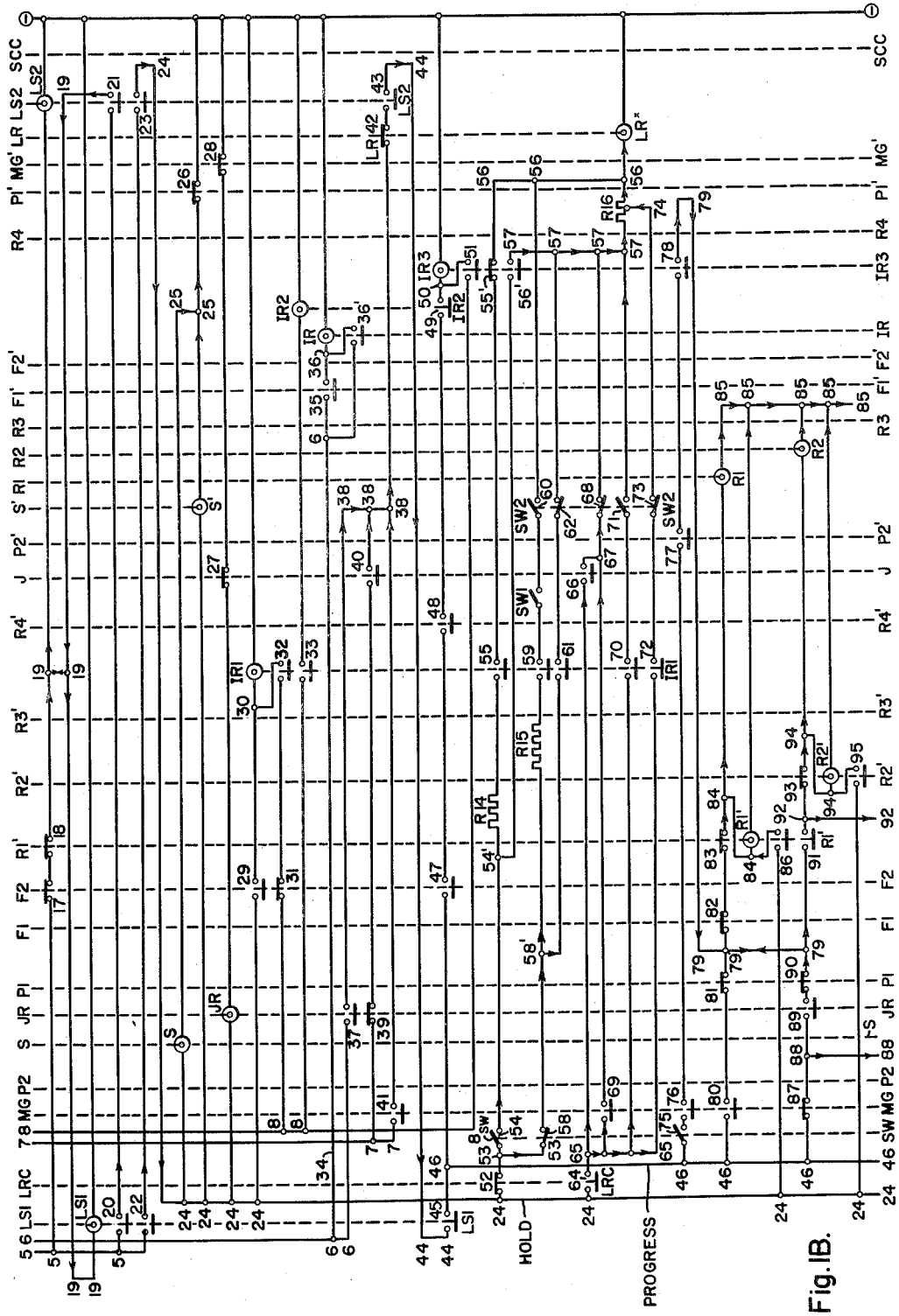

In Fig. 1A, I show an illustrative form of embodiment of my invention, in which a high-voltage single-phase trolley 10 supplies power to the pantograph 11 of a rectifier-powered railway-vehicle such as a locomotive or a unit of a multiple-unit (MU) car-system, the latter being specifically illustrated. The pantograph 11 is connected to the high-voltage terminal of the primary winding of a step-down transformer 12. The low-voltage terminal 13 of said primary winding is connected to ground through a series capacitor SC, which is normally bypassed by the back-contacts SCC of a series-capacitor contactor SCC. The series capacitor, when it is not short-circuited by the contacts SCC, is protected against overvoltages (due to excessive currents), by a gap G, which is conventionally illustrated as a horned gap, although, in reality, it will be of a type which does not extinguish its own arc, but has to be protected, in turn, by another equipment which has nothing to do with my present invention.

All of the electrically controlled relays and switches which are shown in the drawing are diagrammatically indicated as having vertical switch-stems (indicated by dotted lines), which are biased by gravity toward their lowermost positions and all of these switches and relays are shown in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

The secondary winding of the transformer 12 is provided with a mid-tap X (which serves as the return-conductor or negative lead of the rectified power), and two terminals which are connected, respectively, to the midpoints of two balance-coils BC and BC'. The balance-coils BC and BC' are connected to the anode-circuits of four rectifiers which are illustrated as being ignitrons I1, I2, I1' and I2', although other rectifying means might be used, and other rectifier connections might be used. The ignitrons are provided with ignitor-circuits I, the details of which are well known.

The cathodes of the ignitors are connected, in pairs, to two cathode-circuits L1 and L2, which, in the illustrated circuit, pass, respectively, through the two coils LRC1 and LRC2 of a limit-relay change-relay LRC, being then joined to a lead L3 which constitutes the positive output-terminal of the rectifier-assembly. The limit-relay change-relay LRC is a device, which I preferably use (when using a rectifier-assembly in which the load-current is shared by two tubes in parallel with each other), for detecting the loss of a rectifier-tube, and for using this detection as a means for changing the setting of the limit-relay which will be subsequently described. The illustrated form of the limit-relay change-relay LRC is only one of a number of devices which could be used for this tube-supervising detection-means. As shown, it has two opposing operating-coils LRC1 and LRC2 which are disposed in inductive relation to a common movable core 14, which is disposed within a stationary magnetizable return-circuit 14'.

A rectifier-powered railway-car has certain auxiliary direct-current load-devices which must be powered in some way; and my illustrated equipment is shown as one in which the output of the main rectifiers I1, I2, I1' and I2' is used for powering these auxiliary load-devices. Consequently, in Fig. 1A, I have shown the positive lead L3 as being connected, first, through a circuit-breaker CB, to the auxiliary load-devices 15, the negative terminal 16 of which is connected to the secondary midpoint X through a choke coil CC1.

In Fig. 1A, I have shown a four-motored propulsion-equipment which includes four series direct-current traction-motors 1, 2, 3 and 4, having respective field-windings 1F to 4F, which are serially connected to their respective armature-circuits through diagrammatically indicated reversing-switches RS1 to RS4.

The illustrated connections for the traction-motors are traceable from the positive rectifier-output lead L3, through a line-switch LS1, an armature-terminal A1, the first motor-armature 1, an armature-terminal A1', the first field-reversing switch RS1, an intermediate terminal X1, a motor-connection switch P1, an armature-terminal A2', and a first accelerating-resistance R11, to a second intermediate terminal X2, which constitutes the end of the first line of the motor-connections, as illustrated in Fig. 1A.

A second line of motor-connections, in Fig. 1A, is traceable from the armature-terminal A1, through a motor-connection switch P2 to an intermediate connection X3, the second field-reversing switch RS2, an armature-terminal A2, the second motor-armature 2, the previously mentioned armature-terminal A2', and a resistance-shorting switch R4, to the previously mentioned intermediate connection X2. The resistance-shorting switch R4, when closed, thus shorts out all of the first accelerating-resistance R11. Successive intermediate portions of this accelerating-resistance may also be shorted out through switches R1 to R3.

The energizing connections for the third traction-motor 3 are traceable, in Fig. 1A, from the armature-terminal A2', through a motor-combination switch J, an armature-terminal A3, the motor-armature 3, an armature-terminal A3', the third field-reversing switch RS3, an intermediate terminal X4, and a motor-combination switch P1', to an armature-terminal A4'.

The last motor-energizing circuit, in Fig. 1A, is traceable from the armature-terminal A1, through a motor-combination switch MG, an intermediate terminal X5, a second accelerating-resistance R12, the armature-terminal A3, a motor-combination switch P2', an intermediate terminal X6, the fourth field-reversing switch RS4, an armature-terminal A4, the motor-armature 4, and the main operating-coil LR of the limit-relay LR, to the previously mentioned armature-terminal A4'. Successive portions of the second accelerating-resistance R12 are shorted out by resistance-shorting switches R1' to R4', respectively.

Three intermediate main-circuit connections are also shown in the illustrated Fig. 1A. The first such connection uses a motor-connection switch S, which joins the intermediate terminals X1 and X3. The second such intermediate connection uses a motor-combination switch JR, which joins the intermediate terminal X5 to the intermediate terminal X2 through a small accelerating-resistance R13, and this intermediate circuit-connection is extended on, from the intermediate terminal X2, through a motor-combination switch MG' to the armature-terminal A4'. The third intermediate connection in Fig. 1A uses a motor-combination switch S', which joins the intermediate terminals X4 and X6.

The negative-terminal connection for the main-motor circuits shown in Fig. 1A are traceable from the motor-armature terminal A4', through a second line-switch LS2, to an intermediate terminal X7, which is connected to the secondary mid-tap X through a choke-coil CC2.

In the motor-controlling circuits shown in Fig. 1A, I have provided two field-shunts FS and FS', each of which comprises a reactance and a tapped resistance. The first field-shunt FS is connected between the armature terminals A1' and A2, by means of a field-switch F1, while a second field-switch F2 is used to bypass some of the resistance of the field-shunt FS. The second field-shunt FS' is similarly connected, between the armature-terminal A3' and A4, through a field-switch F1', while a second field-switch F2' is used to short out some of the resistance of this second field-shunt FS'.

The car is provided with a master controller MC, which is illustrated, in Fig. 1A, as a simple contact-making drum-controller, having an off-position and four on-positions 1 to 4. The master controller successively energizes four control-wires 5 to 8, respectively, from a positive control-circuit bus (+), through a switch 9.

Referring now to Fig. 1B, which fits underneath Fig. 1A, the first control-wire 5 initiates the so-called switching-operation of the main motors, in which all of the motors are connected in series, through both accelerating-resistances R11 and R12, for moving the train or car slowly, as in taking up draw-bar slack in a train, or in slowly moving a car or train, at a station, during track-switching operations.

The control-wire 5 is first connected in a circuit which includes a back-contact 17 on the field-switch F2, a back-contact 18 on the resistance-switch R1', a conductor 19, and the operating-coil LS2 of the second line-switch LS2, this circuit being completed at the negative relaying-bus (−). The connection 19 extends down and to the left, to also energize the operating-coil LS1 of the first line-switch LS1. A holding-circuit is next shown, from the wire 5, through an LS1 make-contact 20, and an LS2 make-contact 21, to the conductor 19, for holding the two line-switches energized as long as the wire 5 remains energized. And finally a circuit is shown, from the wire 5, through an LS1 make-contact 22 and an LS2 make-contact 23, to a wire 24, which constitutes a hold-circuit for the rest of the control-circuit, this hold-circuit remaining energized as long as power is applied to the main traction-motors.

The first two control-circuit, branching to the right from the hold-circuit 24, contain the operating coils S and S' of the correspondingly lettered motor-connection switches, and extend to a connection-point 25, and thence through a P1' back-contact 26, to the negative bus (−). The next circuit, in Fig. 1B, energizes the JR coil through a back-contact 27 of the J switch, and a back-contact 28 of the MG' switch.

The next circuit, in Fig. 1B connects the hold-wire 24 through an F2 make-contact 29 to a conductor 30, which is used to energize the coil of an interlock-relay IR1. Below this circuit, a connection is made from the control-wire 8, through an F2 back-contact 31 and an IR1 make-contact 32, to said conductor 30, for thereafter holding the interlock-relay IR1 energized, as long as the 8 wire is energized, after the F2 switch is deenergized. The next circuit extends from the 8 wire, through an IR1 make-contact 33, to energize the coil IR2 of an interlock-relay of the same designation. This control-wire 8 is energized in the fourth on-position of the master controller, for the purpose of establishing the parallel motor-combination, in which all four of the traction motors are connected in parallel with each other.

The next circuit in Fig. 1B extends from the wire 6, which is energized in the second on-position of the master-controller, for the purpose of establishing the series running-connections of the four main motors 1 to 4, in which all four of these motors are connected in series with each other. The first circuit-connection 34 from said wire 6 extends through an F1' make-contact 35 to a circuit 36, which energizes the operating-coil of an interlock-relay IR. This relay IR is shown as having a make-contact 36' which provides a holding-circuit around the F1' make-contact 35.

The control-wire 6 has a second branch-circuit which constitutes the main control-circuit from said wire 6, comprising a JR make-contact 37, which is connected to an intermediate circuit 38, which will be subsequently referred to.

To keep, in proper order, the control-circuits which are shown in Fig. 1B, reference will next be made to the control wire 7, which is energized, in the third on-position of the master-controller, for the purpose of establishing the series-parallel motor-connections, in which the four-traction motors are connected, two in series, and two in parallel. This control-wire 7 has two branch-circuits which extend to the intermediate circuit 38, one of these branch circuits being through a JR back-contact 39 and a J make-contact 40, while the second branch-circuit contains an MG make-contact 41.

The intermediate circuit 38 is the circuit which is used to initiate the automatic progression of the motor-accelerating steps, under the control of the back-contact 42 of the limit-relay LR. From this limit-relay contact 42, the accelerating-circuit extends through an LS2 make-contact 43, a circuit 44, and an LS1 make-contact 45, to a circuit 46, which constitutes the progress-wire for all control-circuits which are to be completed only when the limit-relay LR drops back to its deenergized position.

The first circuit from the progress-wire 46 is shown, in Fig. 1B, as including an F2 make-contact 47, an R4' make-contact 48, an IR2 make-contact 49, and a circuit 50 which energizes the coil of an interlock-relay IR3. This interlock-relay IR3 has a make-contact 51 which serves as a holding-circuit extending from the control-wire 8 to the circuit 50.

Next, in Fig. 1B, are eight control-circuits having to do with the energization of a rate-coil LR$^x$, which assists the main series coil LR (which is located in the motor-circuits of Fig. 1), to help to pick up the limit-relay LR, thus making said limit-relay pick up and drop out its back-contact 42 at a smaller value of the motor-armature current, dependent upon the strength of energization of said rate-coil LR$^x$, which thus reduces the current-setting of the limit-relay LR.

The first of these eight LR$^x$ control-circuits extends from the hold-wire 24, through an LRC back-contact 52, to a circuit 53, and thence, through a normally open up-contact 54 of a manually operable multipole-switch SW, to a conductor 54'. This first circuit then extends on, from the conductor 54', through a resistance R14, an IR1 make-contact 55, and an IR3 back-contact 55', to a circuit 56 which energizes the limit-relay rate-coil LR$^x$. A second LR$^x$ control-circuit extends from the conductor 54' through an IR3 make-contact 56' to a conductor 57, which will be referred to again, later on. A third circuit extends from the conductor 53, through a normally closed up-contact 58 of the switch SW, a circuit 58', a resistance R15, an IR1 make-contact 59, a normally open manually operated single-pole switch SW1, and a normally open up-contact 60 of a manually operable multipole-switch SW2, to the aforesaid conductor 56. A fourth LR$^x$ control-circuit extends from the conductor 58' through an IR1 make-contact 61, and a normally closed up-contact 62 of the switch SW2, to the conductor 57.

A fifth LR$^x$ control-circuit extends from the hold-wire 24, through an LRC make-contact 64, a conductor 65, and a J-switch make-contact 66, to a wire 67. The sixth LR$^x$ control-circuit extends from the wire 65 through an MG make-contact 69 to said wire 67, and thence through a normally closed up-contact 68 of the switch SW2 to the conductor 57. The seventh LR$^x$ control-circuit extends from the wire 65, through an IR1 make-contact 70 and a normally open up-contact 71 of the switch SW2, to the conductor 57, and thence on through a resistance R16 to the wire 56 which energizes the $LR^x$ coil. The eighth control-circuit for this $LR^x$ coil extends from the wire 65, through an IR1 make-contact 72 and a normally closed up-contact 73 of the switch SW2, to a wire 74 which shorts out a major portion of the resistance R16.

The next control-circuit which is shown in Fig. 1B extends from the progress-wire 46, through a normally open up-contact 75 of the switch SW, an MG make-contact 76, a P2' make-contact 77, and an IR3 make-contact 78, to a control-wire 79 which is used to initiate the progression of the resistance-shorted switches. Next comes another branch from the progress-wire 46, through an MG make-contact 80 and a P1 back-contact 81, to said control-wire 79, and thence on, through an F1 back-contact 82, an R1' back-contact 83, a circuit 84 and the R1 coil, to a circuit 85 which continues on down into Fig. 1C, and which will be subsequently further described. Next, in Fig. 1B, the circuit 84 is connected on down, to energize the R1' coil, which is connected on, to the conductor 85. The R1' switch has a make-contact 86 which is connected in a holding-circuit from the hold-wire 24 to the conductor 84. Next, in Fig. 1B, is a circuit which extends from the progress-wire 46, through an MG back-contact 87, a conductor 88, a JR make-contact 89, and a P1 back-contact 90, to the control-wire 79, and thence on, through an R1' make-contact 91, a circuit 92, and R2' back-contact 93, a circuit 94, and the R2 coil, to the circuit 85. The circuit 94 extends on down, to energize the R2' coil, which is connected on, to the circuit 85; and this R2' switch has a make-contact 95 which is included in a holding circuit from the hold-wire 24 to the conductor 94.

Figure 1C:
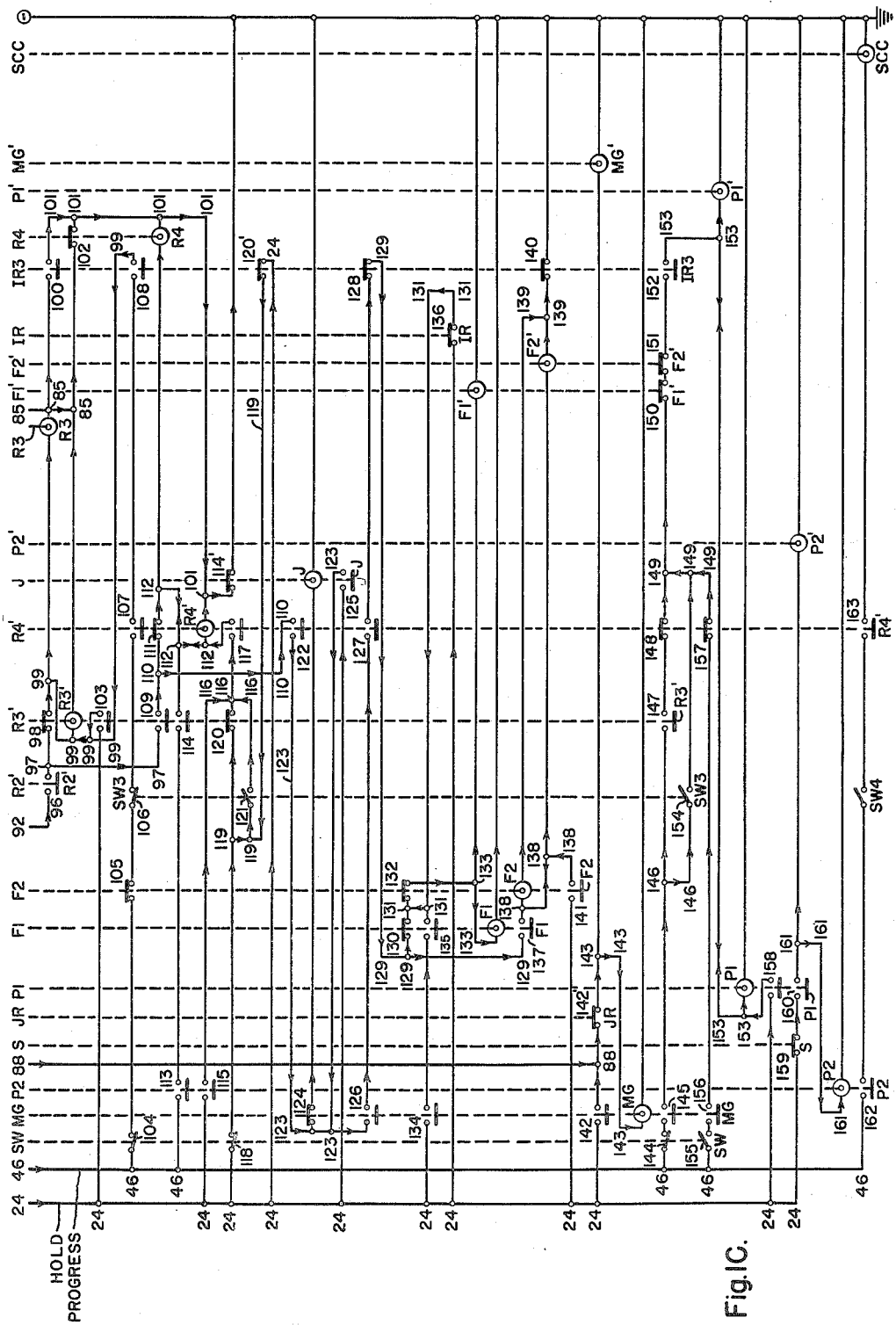

Referring, now, to Fig. 1C, which fits below Fig. 1B, the first circuit therein shown extends from the conductor 92, through an R2' make-contact 96, a conductor 97, an R3' back-contact 98, a conductor 99, and the R3 coil, to the previously mentioned circuit 85, and thence on, through an IR3 make-contact 100, to a circuit 101 which will be subsequently referred to. The conductor 99 extends down, to energize the R3' coil, which is connected on, to the circuit 85, which extends still further on, through an R4 back-contact 102, to the circuit 101. The R3' switch has a make-contact 103 which establishes a hold-circuit from the hold-wire 24 to the conductor 99. Next comes a circuit which extends from the progress-wire 46, through a normally closed up-contact 104 of the switch SW, an F2 back-contact 105, and a normally closed up-contact 106 of a manually operated multipole-switch SW3, a R4 make-contact 107, and an IR3 make-contact 108, to the conductor 99 which energizes the coils R3 and R3'.

A circuit is next shown, in Fig. 1C, from the conductor 97, through an R3' make-contact 109, a conductor 110, a R4' back-contact 111, a conductor 112, and the R4 coil, to the conductor 101. A circuit is next shown from the progress-wire 46, through a P2 make-contact 113 and an R3' make-contact 114, to the conductor 112 which energizes the R4 coil. This conductor 112 extends on down, to energize the R4' coil, which extends on, to the circuit 101, and from this circuit 101, a branch extends down, through a J-switch back-contact 114', and on to the negative relaying-bus ( — ).

A triple-path holding-circuit is provided, for the conductor 112 which energizes the coils R4 and R4'. The first of these holding-circuit paths extends from the hold-wire 24, through a P2 make-contact 115, to a conductor 116, and thence on, through an R4' make-contact 117, to the conductor 112. A second hold-circuit path extends from the hold-wire 24, through a normally closed up-contact 118 of the switch SW, a conductor 119, and an R3' back-contact 120, to the conductor 116. A third hold-circuit path extends from the hold-wire 24, through and IR3 back-contact 120', to the conductor 119, and thence on, through a normally open up-contact 121 of the switch SW3, to the conductor 116.

A circuit is next shown, in Fig. 1C, extending from the conductor 110, through an R4' make-contact 122, to a circuit 123, which is used in the energization of the motor-combination switch J and the four field-switches F1, F1', F2 and F2'. A circuit extends from the conductor 123, through an MG back-contact 124, to energize the J coil. This J switch is provided with a make-contact 125 which is included in a holding-circuit from the hold-wire 24 to the conductor 123. The conductor 123 is also used to provide a circuit which extends through an MG make-contact 126, an R4' make-contact 127, and an IR3 back-contact 128, to a conductor 129 which is used in energizing the field-switches.

Thus, the conductor 129 is connected on, through an F1 back-contact 130, a conductor 131, and an F2 back-contact 132, to a circuit 133, which energizes both the F1' coil and the F1 coil. Two holding-circuits are provided for the conductor 131. The first of these holding-circuits extends from the hold-wire 24, through an MG make-contact 134 and an F1 make-contact 135, to said conductor 131. A second holding-circuit extends from the hold-wire 24 through an IR back-contact 136 to said conductor 131.

The conductor 129 is also connected, through an F1 make-contact 137, a circuit 138, and the F2 coil, to a circuit 139. The circuit 138 also extends down through the F2' coil to said circuit 139, and thence extends on, through an IR3 back-contact 140, to the negative control bus ( — ). The F2 coil is provided with a make-contact 141 which establishes a holding circuit between the hold-wire 24 and the circuit 138.

A circuit is next shown, in Fig. 1C, extending from the hold-wire 24, through an MG make-contact 142 to the previously mentioned conductor 88, and then on, through a JR back-contact 142', to a conductor 143 which energizes both the MG' coil and the MG coil.

The next sequence, in the operation of the motor-control, has to do with the initiation of the parallel motor-combination, in which all four of the traction-motors are connected in parallel with each other. This sequence is initiated, in Fig. 1C, from the progress-wire 46, which has a circuit extending through a normally closed up-contact 144 of the manually operated switch SW, an MG make-contact 145, a conductor 146, an R3' make-contact 147, an R4' back-contact 148, a conductor 149, an F1' back-contact 150, an F2' back-contact 151, and an IR3 make-contact 152, to a conductor 153, which energizes both the P1' coil and the P1 coil. The conductors 146 and 149 are also joined by a bypass-circuit which includes a normally open up-contact 154 of the switch SW3. The conductor 149 is also energized from a circuit which starts with the progress-wire 46, and extends through a normally open up-contact of the manually operated switch SW, an MG-in interlock 156, and an R4'-out interlock 157, to said conductor 149.

The P1 switch also has a make-contact 158 which serves as a holding-circuit between the hold-wire 24 and the conductor 153.

The next control-circuit in Fig. 1C extends from the hold-line 24, through an S-switch back-contact 159 and a P1 make-contact 160, to a conductor 161 which energizes both the P2' coil and the P2 coil.

The final control-circuit in Fig. 1C extends from the progress-wire 46 to a P2 make-contact 162, a normally open manually operable switch SW4, an R4' make-contact 163, and the SCC coil, and thence to the negative control-bus ( — ).

The operation will now be described and explained, with the aid of Figs. 2 to 5, with special emphasis on the novel features of my invention.

Fig. 2 is a sequence chart of the control-scheme shown in Figs. 1A to 1C, with the manually operated switches SW to SW3 in their illustrated up-positions, but with the switch SW4 in its closed position, and with the positive-bus switch 9 closed, in readiness for a manipulation of the master controller MC. The closed positions of the various electrically controlled switches and relays are indicated, in Fig. 2, by small circles, as is customary in such sequence charts. A last column is provided, in Fig. 2, showing the motor-connections. It will be noted that, in passing from the series motor-connection, in step 7, to the series-parallel motor-connection, in step 8, I use the well-known bridging type of transition, as indicated by the transition-step TR between the steps 7 and 8 in Fig. 2. In this transition, while the J-switch is closed, and—assuming that the master controller is in either its third or fourth on-position so that the wire 7 is energized—as soon as the limit-relay LR drops out, so as to close its contact 42, the progress-wire 46 is energized in Fig. 1B, through the J-in interlock 40 and the LR back-contact 42; and this progress-wire 46 energizes the conductor 88 in Fig. 1B, through the MG-out interlock 87, and the conductor 88 in Fig. 1C thereupon energizes the MG and MG' switches. The picking up of the MG switch deenergizes the J-switch at 124 in Fig. 1C, thereby completing the transition as shown in step 8 of Fig. 2.

In passing from the shunted-field series-parallel motor-connection, in step 14 of Fig. 2, to the full-field parallel motor-connection in step 15, I use the well-known shunt type of transition, as indicated by the two transition-steps TR between the steps 14 and 15 of the sequence chart. In this shunt-type of transition, in the illustrated control-diagrams, when the limit-relay LR drops down, while the second field-switches F2 and F2' are closed (assuming that the master controller is in its fourth on-position), the inter-lock relay IR3 deenergizes the F2 and F2' coils, at 140 in Fig. 1C, and at the same time said interlock-relay IR3 bypasses the R4-out interlock 102, at 100 in Fig. 1C. Then the dropping out of the field-switch F2 energizes the R3 and R3' switches, at 105 in Fig 1C, and the picking up of the R3' switch deenergizes the R4 and R4' switches, at 120 in Fig. 1C. The dropping out of the R4' switch energizes the P1 and P1' switches, at 148 in Fig. 1C; and the picking up of the P1 switch energizes the P2 and P2' switches, at 157 in Fig. 1C, thus completing the parallel-motor connections shown in step 15 of Fig. 2.

The interlocking switches IR to IR3 perhaps deserve special mention, except for the interlock switch IR, which is known, and which is used for the purpose of dropping out the first field-switches F1 and F1', at 136 in Fig. 1C, when this interlock-relay IR is energized by the control-wire 6 in Fig. 1B, when the master controller MC is advanced beyond its first on-position.

The interlock relay IR1 is energized by the F2-in interlock 29, as soon as the motor-control sequence reaches its full-shunted-field step, No. 14 in Fig. 2, and this interlock relay IR1 holds itself in, through its contact 32, after the field-switch F2 drops out during the initial stages of the first transition-step TR after the step 14 in Fig. 2. This relay IR1 is useful in controlling the energization of the rate-coil LR$^x$ of the limit-relay LR, as will be subsequently described.

The interlock relay IR2 is not energized until the master controller has been moved to its fourth on-position, which energizes the control-wire 8. This relay thus differs from the interlock relay IR1, which became energized in the last position of the operation under the control-wire 7, even before the control-wire 8 was energized.

The interlock relay IR3 is energized jointly in response to the dropping out of the limit-relay contact LR, in step 14 of the sequence-chart in Fig. 2, and the energization of the control-wire 8 in the fourth on-position of the master controller. Thus, the LR-out contact 42 insures that the limit-relay LR has dropped out, in Fig. 1B; the F2-in and R4'-in interlocks 47 and 48, in Fig. 1B, insure that the switches R4, R4' and F2, F2' are closed, in the fourteenth step of the sequence chart, Fig. 2; and the IR2-in interlock 49, in Fig. 1B, insures that the master controller has been moved into its fourth position in which the wire 8 is energized, whereupon the interlock relay IR3 is energized. This IR3 relay thereupon locks itself in, at 51 in Fig. 1B, as long as wire 8 remains energized. This interlock relay IR3 is subsequently used, through its interlocks 78, 108 and 153, to effect those subsequent-operations which must wait upon the step-by-step energization of the progress-wire 46, while the master controller is in its fourth on-position, with its wire 8 energized.

Before leaving the discussion of the sequence chart of Fig. 2, it should be noted that, when not limited to a traction-motor assembly consisting of only four traction-motors, as shown in Fig. 1A and in the last column of Fig. 2, my invention is also applicable to traction-motor assemblies consisting of any even number of motors, greater than two. For example, if a six-motor assembly were utilized, the last column of Fig. 2 would look like Fig. 3, in which there are four sequences of motor-connections, namely, a first sequence $a$, in which all six motors are in series, a second motor-connection $b$, in which there are three motors in series and two in parallel, a third motor-connection $c$, in which there are two motors in series and three in parallel, and a final motor-connection $d$, in which all six motors are in parallel with each other. This is intended to be a general illustration of the fact that I am not limited to the particular number of motors which I have shown in my illustrated form of embodiment of the invention.

Fig. 4 shows curves which help to show the operation of the control-sequences which are shown in Fig. 2, omitting, for simplicity, the first field-shunting step, which is step 13 in Fig. 2, and omitting the last voltage-increasing step, No. 17, which will be separately discussed later on. Fig. 4 shows four upwardly slanting curves, numbered 161 to 164, plotting tractive effort (TE) against car-amperes, for the series motor-connection, the series-parallel full-field motor-connection, the series-parallel shunted-field motor-connection, and the parallel motor-connection, respectively. This figure also shows four downwardly curving curves, 165 to 168, plotting the tractive effort against the car-speed in miles per hour (m.p.h.), with the same four successive motor-connections. These eight curves represent the operating conditions, with all accelerating-resistances cut out, in a rectified-power supply-system in which the rectifier-output has a drooping characteristic as shown by the dotted line 169, wherein the rectifier volts are plotted against the amperes which are supplied by the rectifier, which is the same as the car-amperes.

In Fig. 4, it is assumed that the accelerating resistances are controlled so as to accelerate first at 450 amperes per motor, with all four motors in series, so that there are 450 amperes per car, as shown by the vertical 450-ampere line, which intersects the curve 161 at the point A, with a tractive effort of about 7500 pounds, as shown in Fig. 4. Crossing over, at this tractive effort, to the curve 165, the same operating-conditions are found at the point B on said curve 165, which shows a car-speed of 14.5 miles per hour. A transition is now made to the full-field (F.F.) series-parallel (S.P.) curve 162, with the same number of amperes per motor-armature, but since there are now two motors in parallel, the car-amperes will be 900. We then use the accelerating resistance to bring the operation up, on the vertical 900-ampere line, to the curve 162, where the point C is reached, in Fig. 4, with a tractive effort of about 7600 pounds. Passing over to the curve 166 at the same tractive effort, the point D is reached, showing a car-speed of 27.5 m.p.h. We now pass to shunt-field operation, and for simplicity, I have shown, in Fig. 4, only the shunted-field (S.F.) curves 163 and 167 corresponding to the second step of field-shunting, still using the series-parallel (S.P.) motor-connection. Continuing upward, again, on the 900 ampere line, an intersection-point E is reached, on the curve 163, at a tractive effort of 5450 pounds. Moving over, at this same tractive effort, to the curve 167, shows an operating-point F, at a car-speed of 40 miles per hour.

We come, now, to the point in the operation at which, in the illustrated example, we assume that the transformer-rating, or the rectifier-rating, or the commutation-limit of the traction-motors, or any of these limits, is such that it is not desirable to enter into the final, high-speed stage of our motor-combinations at more than 900 amperes per car, which means, with four motors in parallel, 225 amperes per motor. For this purpose, it is necessary to change the limit-relay setting from 450 amperes to 225 amperes, which can be accomplished, for example, by energizing the rate-coil $LR^x$ through the resistance R16, as through the circuit 61—62 in Fig. 1B. For simplicity of control, it has been assumed, in the simplified-control circuits shown in Fig. 1B, that this resetting of the limit-relay LR is accomplished as soon as the motor-control reaches the full-shunted-field series-parallel condition which is shown in step 14 of the sequence chart of Fig. 2. When this happens, the field-relay interlock 29 energizes the interlock-relay IR1 in Fig. 1B, and the IR1-in interlock 61 energizes the rate-coil $LR^x$ through the resistance R16, causing the car to ride along, on the curve 163 of Fig. 4, until the car-amperes have been reduced to 450, as indicated by the point G, at something like 1700 pounds. Passing over, at this same tractive effort, to the curve 167, we find the point H, showing that the car-speed is about 73 m.p.h.

It is assumed that a transition is now made to four motors in parallel, and we rise again, on the 900-ampere line in Fig. 4, to find an intersection I, with the curve 164, showing a tractive effort of 2900 pounds. Passing over, at this same tractive effort, to the curve 168, brings us to the point J, showing the same speed, 73 m.p.h., at which we made the transition. In the motor-operating sequence which is depicted in Fig. 4, this is the final motor-operating step, and the car rides along, on the curves 164 and 168, from the points I and J respectively, with the tractive effort gradually decreasing, the speed increasing, and the amperes decreasing, as shown on these curves.

In Fig. 4, I have also shown the dotted line voltage-regulation curve 169 of the rectifier-output. My reason for doing this is, not only because I have plotted the tractive-effort curves 161 to 168 for motors operating on the voltages shown on this voltage-regulation curve, but also because this regulation-curve, 169, serves as a basis for an explanation of some of the peculiar features of rectifier-power operation.

Rectifier-powered cars or locomotives have heretofore universally used ignitrons as the rectifiers, and my present explanations will be directed primarily to the operational requirements of ignitrons. If other types of rectifiers should ever be used, it is probable that similar requirements will be met, at least qualitatively, with probable changes in the precise limits of satisfactory operating conditions.

In ignitron-powered cars, the reactance of the trolley-line 10 (Fig. 1B), and especially the reactance of the transformer 12, are so chosen that the rectifier-output will have a steeply drooping voltage-characteristic, somewhat like the dotted line 169 in Fig. 4, for the protection of the ignitrons. Specifically, the regulation is such that, in the event of an arc-back in one of the ignitron-tanks, the half-wave of current which passes through that ignitron does not exceed a crest value of 10,000 amperes, for the particular ignitrons which are used in Fig. 1A. This is primarily for the protection of the faulted ignitron, so as to prevent permanent damage thereto, but it is obvious, also, that some kind of limit must be placed on the possible momentary current-value which may be carried by the transformer 12.

The effect of this steeply drooping voltage-characteristic 169, on the motor-operation, will be seen by extending the 450-ampere line up until it intersects with this voltage-curve at about 640 volts, as shown at K; and by extending up the 900-ampere line until it intersects with said voltage-curve at about 560 volts, as shown at L. If we had not stepped back the limit-relay setting to 225 amperes, when entering into the parallel motor-combination, we would have had 1800 car-amperes during this portion of the operation. By extending the 1800-ampere line up to the voltage-curve 169, we find a voltage of about 390 volts, as shown at M. Thus, if the limit-relay LR had not been recalibrated, in going into the parallel motor-combination, the steeply drooping voltage-regulation would have caused a very objectionable drop in the rectifier output-voltage, from 560 volts to 390 volts, when going from the series-parallel motor-combination to the parallel motor-combination. With the recalibration of the limit-relay, as above described, we insure that the minimum rectifier-voltage which is available for the traction-motors will be not less than about 560 volts, this minimum voltage being obtained during the acceleration period at 900 car-amperes, in both the series-parallel and the parallel motor-combinations. When the motors are operating, in either one of these combinations, after full acceleration has been reached, in that combination, the motor-amperes drop off, as shown by the curves 163 and 164, thus working on a higher portion of the volt-ampere regulation-curve 169.

Figure 5:
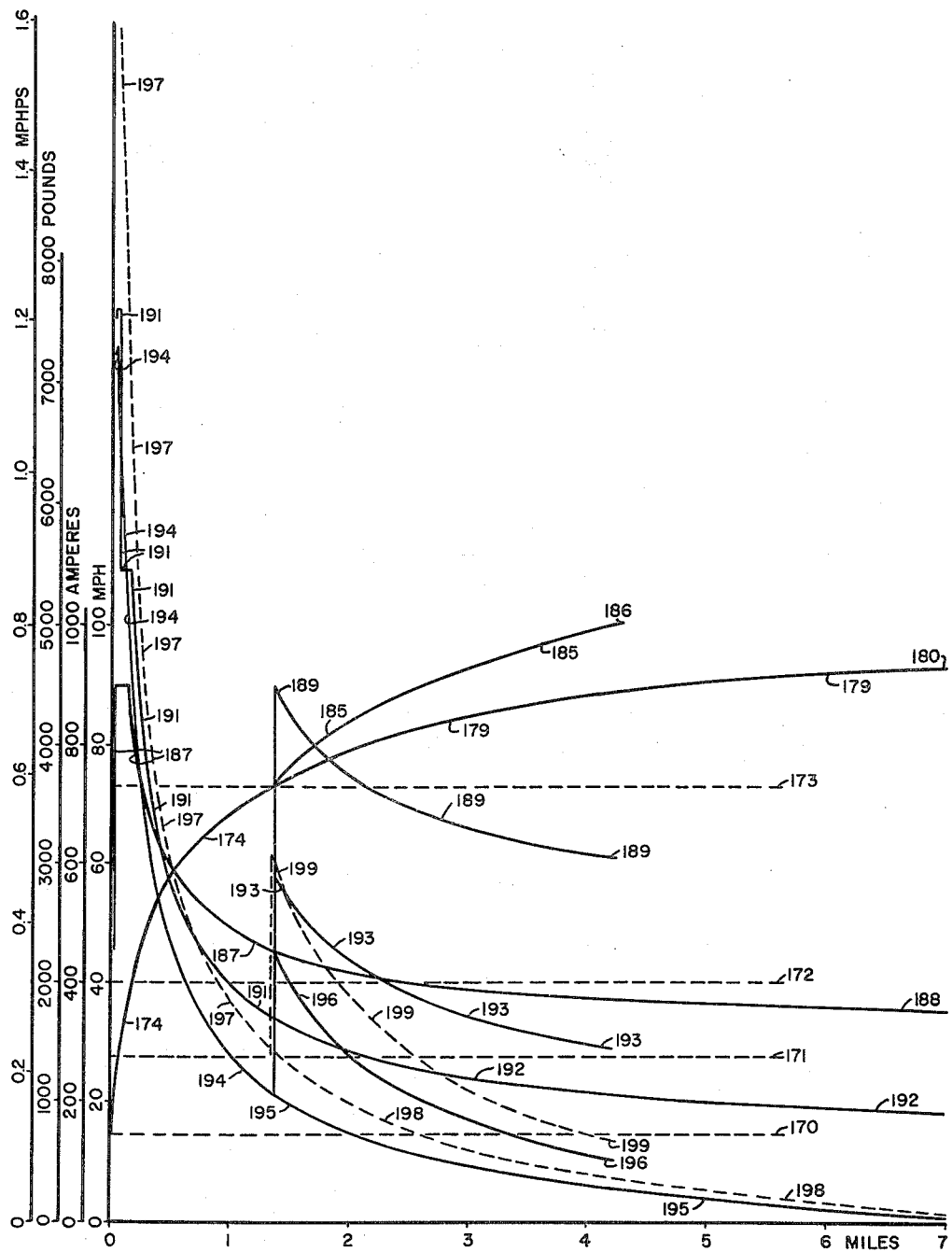
Fig. 5 is a curve diagram showing the performance of the illustrated car, plotted against the distance, in miles, which must be traveled, in order to attain the various car-speeds in miles per hour.

The most important advantage of my invention is shown in Fig. 5, in which the car-performance is plotted, in terms of the distance, in miles, which has to be traveled on level tangent track, in an illustrative example, in order to attain various car-speeds, expressed in miles per hour. The above-described transition-points, at 14.5, 27.5, 40 and 73 m.p.h., are indicated by the dotted horizontal lines 170, 171, 172 and 173, in Fig. 5. A heavy line 174, extending up to 73 m.p.h., shows the carspeeds, plotted against the number of miles which have to be traveled on level tangent track, in order to reach the respective speeds, in an illustrative example. The speed of 73 m.p.h. is the speed at which I have made the transition to the parallel motor-combination, in the illustrative example which I have described above.

If I had not introduced the four-parallel motor-combination, I would have continued to operate in the series-parallel shunted-field combination (S.P., S.F.), as shown by the heavy-line curve 179 in Fig. 5, and the car would have continued to operate, up to a balancing-speed of 95 m.p.h., which would require about 29 miles of level tangent track, in order to reach said balancing-speed. At the end of 7 miles, which is as far as Fig. 5 goes, the car-speed would be only about 93 miles per hour, as shown at the point 180 in Fig. 5. This is representative of the performance which was available in the prior art, prior to my present invention.

With my prseent invention, by introducing the parallel motor-operation, at 73 miles per hour, the speed-distance performance, after this point, is indicated by the heavy-line curve 185 in Fig. 5. This shows that a car-speed of 100 miles per hour, which is assumed to be the maximum desirable operating-speed, in the example which I have chosen for illustration, is reached in only 4.25 miles, as shown at 186; and the balancing speed of this motor-combination is still considerably higher than this point.

The importance of this performance cannot be over emphasized, because practically no level tangent track-length, at least in the eastern United States, is longer than 11 or 12 miles, at the outside, so that, if high car-speed are ever to be obtained, in order to improve the train-schedules, they must be obtained within as small a part of 11 or 12 miles as is feasible. It is understood, of course, that a fast train-schedule is necessary, in order to compete with airplane-travel, in long or moderately long railroad-trips.

Fig. 5 also plots, in light-line curves, the car-amperes, in curves 187, 188 and 189; the car TE in pounds, in curves 191, 192 and 193; and the net TE in pounds, in curves 194, 195 and 196, these net tractive efforts being the forces which are available for car-acceleration, after deducting the tractive effort which is necessary to overcome the train-resistance, which mounts with the speed. I also show three dotted-line curves showing the acceleration, in miles per hour per second (m.p.h.p.s.), as indicated in the curves 197, 198 and 199 in Fig. 5. Each group of three curves shows first the representative prior-art performance up to 73 m.p.h., then the representative prior-art performance beyond 73 m.p.h., and finally the performance of my operation in the parallel motor-combination.

The tractive-effort curves 191, 192, 194 and 195 are quite striking, showing a continuous reduction as the speed is increased, which is very severe after the 40 m.p.h. point, when operating in the series-parallel shunted-field motor-combination, as in the prior art; and the net TE curves 194 and 195 approach zero, as the baalncing-speed is approached.

The corresponding prior-art acceleration-curves 197 and 198, in Fig. 5, show the extremely small acceleration-rates which have heretofore been obtainable at the higher speeds. Starting out with the acceleration-rate of 1.6 m.p.h.p.s., which was maintained up to 27.5 m.p.h., which was attained in a distance of .07 mile, the acceleration-rate dropped to 1.1 m.p.h.p.s. at 40 m.p.h., at a distance of .15 mile. At 73 m.p.h. and 1.4 miles, the acceleation-rate was down to the very low figure of .23 m.p.h.p.s., and beyond this point, without using my transition to four-parallel motor-operation, the acceleration-rate dropped to really insignificant values.

When making the transition into the parallel motor-combination with full field, in accordance with my invention, which was done at 73 m.p.h. and 1.4 miles, in the illustrative example of my invention which was above described, I immediately increased the car tractive effort from 1700 to 2900 pounds, as will be seen from a comparison of curves 191 and 193 in Fig. 5. This increased car tractive effort of 2900 pounds nearly matched the car tractive-effort of 3000 pounds which had been obtained during the series-parallel shunted-field operation at 55 m.p.h. and .42 mile. The accelerating rate was increased, at this 73 m.p.h. transition-point, from .23 to .49 m.p.h.p.s., as will be seen from curves 197 and 199 in Fig. 5. At the maximum desired operating-speed of the car, which is assumed to be 100 m.p.h. in the illustrated example, my added four-parallel motor-connection still had an available acceleration-rate of .11 m.p.h.p.s. These curves point up the practical impossibility, because of performance-limitations, of maintaining the initial acceleration-rate, even though this initial acceleration-rate was well within the margin of passenger-comfort.

The importance of a high accelerating-rate, or high accelerating horsepower, at high speeds, is shown also by an examination of the speed-distance curves 174 and 179 in Fig. 5. A speed of 40 miles per hour was obtained in the relatively insignificant distance of .15 mile, a speed of 55 m.p.h. was achieved in a distance of .42 mile, and it took nearly a mile further to achieve a speed of 73 m.p.h., when operating in the series-parallel shunted-field combination. Up to this point of 73 miles per hour, the speed-distance curve 174 of Fig. 5 was fairly steep, so that not too much mileage was involved, but after this point, even if the same small acceleration of .23 mile per hour per second could have been maintained (which it was not, in the prior art), the speed of the cad made it travel so far, in one second, that the distances really began to pile up, which the car would travel, during each second in which the speed was being increased by .23 m.p.h., for example. Hence, there was a very great necessity for making the car achieve any subsequent speed-increments as quickly as possible, after a certain intermediate speed has been reached. In fact, the series-parallel shunted-field speed-distance curve 179 became absolutely flat at a balancing speed of 95 m.p.h. or 29 miles of track.

The quick attainment of high speeds is important in many ways, aside from the fact that, without my four-parallel motor-operation, the desired top speed of 100 miles per hour could not be reached at all, and a speed of only 86 miles per hour could be reached in a track-length of 3.5 miles, and only 95 miles per hour in a track-length of 29 miles.

It should be understood that modern railroads, for many years, have been diligently removing and improving curves, grades and other speed-restrictive points from their main lines, so that those speed-restrictive points which still remain are difficult and expensive to remove or to improve. Higher accelerating horsepowers, at high speed, such as I obtain with four motors in parallel, can partially remove the schedule-slowing effect of the remaining speed-restrictive points, by making a more effective use of existing stretches of high-speed track. These higher accelerations at high speeds also pay dividends on countless non-scheduled speed-restrictions, which are imposed by signals and other emergency operating-conditions which are to be expected on almost any train-run.

My operation of the traction-motors in the four-parallel full-field motor-combination also gives a better margin, keeping away from the commutation-limit of the motors, because it is easier to obtain good commutation, on rectified direct-current, with the full-field connection, than with a shunted field. At high speeds, where the commutation-limit is being approached, if the field-windings are being shunted by a field-shunt, the reactance of said field shunt must be extremely closely matched to the motor-armature reactance, if the commutation-limit of the motors is not to be seriously curtailed. It will be understood that the so-called commutation-limit is not a hard and fast fixed limit, but it is a point at which the commutation begins to be bad, and beyond which a rapid disintegration of both the brushes and the commutator can be expected, even under the most ideal conditions. It is an act of prudence, on the part of the designer, to keep away from this commutation-limit as far as practicable, thus ensuring a long brush-life and a long commutator-life.

A complete answer to the railway-industry's requirements is not to be found in a larger and heavier transformer, larger and heavier rectifiers, and larger and heavier traction-motors, as a means for obtaining more horsepower; because the thing which is required, in order to obtain a rapid acceleration, is a high ratio of horsepower to car-weight. Hence, it is necessary, in any case, to obtain the best advantage from whatever equipment-weight is being used.

It is to be observed that the balancing-speed, on level tangent track, must be well above the desired operating-speed, if we are to obtain a sufficient accelerating tractive effort, right on up to said desired operating-speed. Hence, it is best to use as high a balancing-speed as is obtainable, relying upon speed-control devices, overspeed trips, and speed indicators (not shown), in order to obtain protection against over-speeds, as has been done heretofore in many railway locomotives operating at 80 m.p.h. or more.

My new motive-power unit, as herein described, is superior to any railway-car propulsion-unit which has been heretofore available or practicable. The light weight of my equipment, together with its high horsepower in the series and series-parallel motor-combinations, make it ideal for local service, which is characterized by many stops; so that speeds, at which transition would be made to the parallel motor-combination, are never reached in the distances between these frequent stops. Yet, with relatively little extra cost or weight, my addition of the parallel motor-combination makes my unit the best unit yet known, for express service, as has been hereinabove pointed out. Thus, my unit is ideal for interchangeable local and express service.

In the illustrative control-system which has been indicated in Figs. 1 and 2, it will be noted that I step back from the fourth resistance-shunting switches R4 and R4' to the third resistance-shunting switches R3 and R3', in making the transition from series-parallel shunted-field operation to four-parallel full-field operation. This is probably an unncessary precaution, in all cases in which the armature-current is reduced from 450 amperes (for example) to 225 ampers (for example), before beginning the transition to parallel motor-operation. If the step-back to the third resistance-switches R3 and R3' is made, and is unnecessary, the limit-relay LR will simply not pick up its back-contact 42, when this connection is reached and hence the return to the fourth resistance-switches R4 and R4' will be made as fast as the switches can move, which is so fast as to be undiscernible to the car-passengers. Nevertheless, the unnecessary wear and tear of the extra switch-operation can be avoided, by avoiding the step-back to the third-resistance-switches R3 and R3', in going into parallel motor-operation at 225 armature-amperes.

My provision of the manually operated switch SW3, in Fig. 1C, has been made, in order to illustrate the point just discussed. When this switch is moved downwardly, it closes its contacts 121 and 154. The contact 121 holds the resistance-switches R4 and R4' energized, while the contact 154 energizes the parallel-motor-combination switches P1 and P1' immediately, in response to a dropping out of the field-switch F2' at 151, subject to the energization of the interlock-relay IR3 at its make-contact 152, without waiting for the R3'-in interlock 147 to close. The SW3 contact 106 opens, in the down-position of said switch SW3, and prevents the immediate reenergization of the third resistance-switches R3 and R3'.

I have shown the manually operated switch SW4, in the last line of Fig. 1C, for the purpose of emphasizing the fact that the last accelerating-step, corresponding to step 17 of the sequence chart of Fig. 2, is not essential, in the broader aspects of my invention. In fact, this step was not shown in my discussion of the sequence of operations in connection with Figs. 4 and 5.

When the switch SW4 is closed, a final motor-accelerating step is obtained by energizing the series-capacitor contactor SCC, the next time the limit-relay LR drops down after the parallel-motor-connections have been established, as indicated by a closure of the P2-in interlock 159. When this happens, the SCC contact, which normally short-circuits the series capacitor SC at the top of Fig. 1A, is opened, thereby inserting the series capacitor in series with the primary winding of the transformer 12. This capacitor SC neutralizes the reactance of this primary winding, and also the average reactance of the trolley-line 10 up to the car-position, so that said capacitor changes the wattless KVA into kilowatts, thereby both improving the efficiency and producing a substantial increase in the A.C. volts which are supplied to the transformer, and in the A.C. volts which are delivered by the transformer to the rectifiers. This increase in the A.C. voltage, aided by a reduction in the angle of overlap, results in a substantial increase in the rectifier output-voltage which is applied to the traction-motors; thus resulting in a very desirable increment of speed.

This speed-changing operation, which is shown by means of the series capacitor SC and its shunting contactor SCC, may be considered, in the broadest aspects of my invention, as being symbolic of any suitable speed-changing step, including other means for increasing the voltage, or including one or more steps of field-shunting, which, as I have said, can be used, if desired, in any or all of the motor-combinations.

The use of the series capacitor SC, as the means for obtaining the last speed-accelerating step, is desirable from the standpoint of protecting the rectifiers against arc-backs, as has been discussed in connection with the voltage-regulation curve 169 in Fig. 4. If an arc-back should occur in one of the rectifiers, while the series capacitor SC in in service, the protective gap G of the capacitor shorts out the capacitor in a very few microseconds, and the old voltage-regulation 169 is obtained, so that the faulted rectifier is protected against permanent damage by reason of excessive arc-back current.

I believe that the series capacitor SC permits me to obtain the greatest percentage-increase in tractive effort, for a given commutation-level and a given transformer KVA.

The presence of the auxiliary load 15 in Fig. 1A constitutes another reason why the voltage-increase, in step 17 of Fig. 2, should be obtained by a gap-protected series capacitor, rather than by a change in the voltage transformation-ratio of the transformer 12. This is because the auxiliary load requires a D.C. voltage which does not vary over limits which are too extreme, avoiding either too high a voltage, such as might be obtained with a change in the transformation-ratio, in the event of a sudden loss of the traction-motor load, as by the operation of an overload breaker (not shown), or too low a voltage, such as might be obtained by operating at 1800 car-amperes, as shown by the point M in Fig. 4, in the event that I had not pulled back my limit-relay setting to 225 armature-amperes, in making the transition to the parallel motor-combination.

The presence of this auxiliary load 15 is perhaps the controlling reason why acceleration is accomplished, in my preferred form of embodiment, by the use of accelerating-resistances, as shown, rather than by tap-changing steps on the transformer 12.

My limit-relay change-relay LRC is provided for the purpose of providing for reduced-speed emergency-operation, whereby the car or locomotive can be moved off of the track, in the event of a loss of a rectifier-tube, in cases in which the total traction-motor car-current is being divided between two rectifiers, as in the illustrated rectifier-assembly which uses two pairs of full-wave rectifiers, with a return-path to the mid-point of the transformer-secondary. Upon the loss of one rectifier-circuit, the relay LRC picks up, and opens its back-contact 52, in Fig. 1B, while closing its make-contact 64. The opening of the back-contact 52 prevents the interlocking relay IR1 from energizing the rate-coil $LR^x$ at the IR1-in interlock 61, in the last series-parallel step 14, as has been previously described.

The closing of the LRC-in contact 64 in Fig. 1B does two things, when the switch SW2 is in its illustrated up-position. First, as shown in Fig. 1B, the contact 64 causes the energization of the rate-coil $LR^x$ through the resistance R16 when the the J-switch picks up and closes its make-contact 66, in the last step, 7, of the series-motor operation, as will be seen from Fig. 2; and when the transition to the series-parallel combination is made, and thereafter throughout any future motor-acceleration, this rate-coil energization is maintained by the picking up of the MG-in contact 69, as shown in Fig. 1B. This prevents the total car-amperes from increasing above 450 amperes, in making this transition to series-parallel operation—which is necessary on the assumption that two rectifiers in parallel can carry 900 amperes, so that one rectifier alone can carry only 450 amperes.

The second thing which is done by the closure of the LRC-in contact 64 in Fig. 1B, when the switch SW2 is in its illustrated up-position, is to cause the interlock-relay IR1, which picks up on step 14 of the sequence chart, to close its make-contact 72 which shorts out most of the resistance R16 which is in series with the rate-coil LR, thereby reducing the limit-relay current-setting from 225 amperes to 112.5 amperes, thereby still keeping within the current-rating of one rectifier, in the event that the car in question is used as a part of a multiple-unit train in which the other cars of the train are capable of accelerating the train to car-speeds over 73 miles per hour, in the illustrated example.

While I have so far described my invention in a rectifier-powered railway-car or locomotive in which the total car-current must not exceed about 900 amperes, my invention is not wholly limited to such an application, in the broader aspects of the invention. There may be times when no decrease in the limit-relay setting is needed, in entering the parallel motor-combination, or when only a moderate decrease may be needed, say to 325 armature-amperes.

My manually operated switch SW2 is provided, in Fig. 1B, to indicate the possibility of such a contingency or mode of operation. When this switch SW2 is moved to its down-position, the previously described rate-changing operations are prevented. When the rectifiers are all intact, the LRC-out contact 52 permits the now-closed contact 60, in the down-position of the switch SW2, to energize the rate-coil LR$^x$ through the large resistance R15, in response to the establishment of the full-shunted-field connections as indicated by the IR1-in interlock 59 in Fig. 1B; that is, this operation is possible if the switch SW1 is closed; otherwise, the resistance R15 does not come into service at all, and no change is made in the setting of the limit-relay LR in passing into the parallel motor-combination.

With the switch SW2 in its down-position, its now-closed contact 71 makes possible the reduction of the limit-relay setting from 450 armature-amperes to 225 armature-amperes, in response to the IR1-in interlock 70, which closes on step 14 of Fig. 2, in the event that there should be a faulted tube-circuit which results in the closure of the LRC-in interlock 64, thus holding total traction-motor car-current to 900 amperes (for example), assuming, now, that two rectifiers in parallel are able to deliver 1800 amperes, at least on an emergency-basis.

I have provided the manually operable switch SW, in Figs. 1B and 1C, to show another respect in which my illustrative scheme of operations is not obligatory, in the broader aspects of my invention. I have already pointed out, in connection with Fig. 5, that when I make my transition to the full-field parallel-motor combination, at 450 car-amperes, and at a car-speed of 73 miles per hour, and at a track distance of 1.4 miles, I obtain practically the same tractive effort as was obtained, in the shunted-field series-parallel combination, at 620 car-amperes, and at a car-speed of 55 miles per hour, and at a track-distance of .4 mile. If the transformer 12 would not become overloaded (as it probably would not, in most cases), it is thus quite feasible to effect the transition to the parallel motor-combination as soon as the series-parallel car-amperes have been reduced to 620 amperes, or other suitable amperage, at which time the parallel motor-combination may be established, with all of the accelerating-resistances R11 and R12 connected in series, and with the limit-relay LR rerated to whatever limit is required for the parallel-motor operation, in accordance with the preceding discussion, said 225 armature-amperes.

In Figs. 1B and 1C, therefore, if the manually operated switch SW is moved to its down-position, the now-closed SW contact 54 (Fig. 1B), in the down-position of the switch SW, energizes the rate-coil LR$^x$ through the resistance R14, which has a value suitable for changing the limit-relay setting from 450 to, say 310 armature-amperes (which is half of 620 car-amperes)—or other suitable intermediate value—as soon as the field-switch F2 is closed, in step 14 of the sequence chart, Fig. 2—as is shown, in Fig. 1B, by the IR1-in interlock 55, which closes in response to the F2-in interlock 29. It will be noted that this rerating of the limit-relay is accomplished by the interlock-relay IR1, which does not wait for the limit-relay LR to drop down. Later on, when the armature-current drops to the 310 amperes value which is set by the resistance R14, the interlock-relay IR3 is energized (from the progress-wire 46), and this relay IR3 then disconnects the resistance R14 (at the IR3-out interlock 55'), and substitutes the resistance R16 (by means of the IR3-in interlock 56'), thus recalibrating the limit-relay to 225 amperes. The now-open SW contact 58 (Fig. 1B), in the down-position of the switch SW, prevents the rerating controls which were previously described.

The now-open SW contact 104 (Fig. 1C), in the down-position of the switch SW, prevents the IR3-in interlocks 100 and 108 from energizing the third resistance-switches R3 and R3' at the very beginning of the transition to the four-parallel motor-combination. The now-open SW contact 118 (Fig. 1C), in the down-position of the switch SW, causes the parallel-connected IR3-out interlock 120' to deenergize the fourth resistance-switches R4 and R4' at the very beginning of the transition to the four-parallel motor-combination, thus inserting all of the accelerating-resistances R11 and R12 in series with the traction-motors.

When the manually operated switch SW is in its down-position, the parallel-motor-combination switches P1 and P1' can not be operated, in Fig. 1C, in response to either the R3'-in interlock 147 or the SW3 contact 154, because of the now-open SW contact 144. However, the now-closed SW contact 155 (Fig. 1C) energizes said parallel-motor-combination switches P1 and P1' in response to the R4'-out interlock 157, the F2'-out interlock 151, and the IR3-in interlock 152. At the same time, the now-closed SW contact 75 (Fig. 1B), in the down-position of the switch SW, causes the sequence of accelerating-resistance operation to start all over again, when parallel-motor operation is called for by the IR3-in contact 78, as soon as the transition to parallel-motor operation is established, as indicated by the closure of the P2'-in interlock 77. The sequential cutting-out of the accelerating-resistances thereupon proceeds, starting with R1 and R1', under the control of the progress-wire 46, which is under the control of the limit-relay contact 42.

While I have illustrated my invention in a preferred form of embodiment and while I have discussed certain alternatives in the operation and construction, I wish it to be understood that I am not limited to the particular described connections, constructions, operations and limits. I wish it further to be understood that my invention contemplates the addition of many unillustrated safeguards and desirable operational features which are known in the art, and contemplates also the possible omission of certain parts, and the possible substitution of equivalents for various elements which have been specifically described.

I claim as my invention:

1. A control system for a plurality of direct current series traction motors comprising switching means for connecting said motors to a direct current power supply in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, and means for changing the current setting of the limit relay means upon transition from a predetermined one of said motor circuits to the next.

2. A control system for a plurality of direct current series traction motors comprising switching means for connecting said motors to a direct current power supply in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, and means responsive to operation of the accelerating means to its maximum-speed position in at least one said motor circuits for reducing the current setting of the limit relay.

3. A control system for a plurality of direct current series traction motors comprising switching means for connecting said motors to a direct current power supply in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, means responsive to operation of the accelerating means to its maximum-speed position in at least one of said motor circuits for reducing the current setting of the limit relay, and means responsive to transition from said one motor circuit to the next for further reducing the current setting of the limit relay.

4. A control system for an electrically propelled vehicle comprising a transformer having primary and secondary windings, means for supplying alternating current to said transformer primary winding, rectifier means connected to the transformer secondary winding, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, and means for changing the current setting of the limit relay means upon transition from a predetermined one of said motor circuits to the next.

5. A control system for an electrically propelled vehicle comprising a transformer having primary and secondary windings, means for supplying alternating current to said transformer primary winding, rectifier means connected to the transformer secondary winding, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, means responsive to operation of the accelerating means to its maximum-speed position in at least one of said motor circuits for reducing the current setting of the limit relay, and means responsive to transition from said one motor circuit to the next for further reducing the current setting of the limit relay.

6. A control system for an electrically propelled vehicle comprising a transformer having primary and secondary windings, means for supplying alternating current to said transformer primary winding, rectifier means connected to the transformer secondary winding, said rectifier means including a plurality of parallel-connected current paths, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, and means responsive to unequal division of current between said parallel-connected current paths of the rectifier means for changing the current setting of said limit relay.

7. A control system for an electrically propelled vehicle comprising a transformer having primary and secondary windings, means for supplying alternating current to said transformer primary winding, rectifier means connected to the transformer secondary winding, said rectifier means including a plurality of parallel-connected current paths, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, and means responsive to loss of one of said parallel-connected current paths of the rectifier means for reducing the current setting of said limit relay.

8. A control system for an electrically propelled vehicle comprising a transformer having primary and secondary windings, means for supplying alternating current to said transformer primary winding, rectifier means connected to the transformer secondary winding, said rectifier means including a plurality of parallel-connected current paths, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, means for detecting loss of one of said parallel-connected current paths of the rectifier means, means for reducing the current setting of said limit relay upon operation of said detecting means, and means controlled by operation of the detecting means for further reducing the current setting of the limit relay prior to the transition from one of said motor circuits to the next.

9. A control system for an electrically propelled vehicle comprising a transformer having primary and secondary windings, means for supplying alternating current to said transformer primary winding, a capacitor connected in series with the primary winding, by pass switch means for bypassing said capacitor, rectifier means connected to the transformer secondary winding, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, and means for effecting operation of said bypass switch means to open position.

10. A control system for an electrically propelled vehicle comprising a transformer having primary and secondary windings, means for supplying alternating current to said transformer primary winding, a capacitor connected in series with the primary winding, bypass switch means for bypassing said capacitor, rectifier means connected to the transformer secondary winding, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, and said control means including means for effecting operation of said bypass switch means to open position during operation in at least one of said motor circuits.

11. A control system for an electrically propelled vehicle comprising a transformer having primary and secondary windings, means for supplying alternating current to said transformer primary winding, a capacitor connected in series with the primary winding, bypass switch means for bypassing said capacitor, rectifier means connected to the transformer secondary winding, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, means for changing the current setting of the limit relay upon transition from a predetermined one of said motor circuits to the next, and means for effecting operation of said bypass switch means to open position.

12. A control system for an electrically propelled vehicle comprising a transformer having primary and secondary windings, means for supplying alternating current to said transformer primary winding, a capacitor connected in series with the primary winding, bypass switch means for bypassing said capacitor, rectifier means connected to the transformer secondary winidng, a plurality of direct current series traction motors, switching means for connecting said motors to said rectifier means in a plurality of motor circuits having different numbers of motors in series and in parallel, accelerating means for progressively varying the voltage applied to each motor during operation in at least some of said motor circuits, control means for effecting operation of said switching means for changing from one motor circuit to another in a predetermined sequence and for effecting operation of said accelerating means in response to transition from one motor circuit to another, said control means including limit relay means responsive to the current of one of the motors for controlling the operation of the accelerating means to limit the motor current to a predetermined value, means responsive to operation of the accelerating means to its maximum-speed position in at least one of said motor circuits for reducing the current setting of the limit relay, and means for effecting operation of the bypass switch means to open position during operation in at least one of said motor circuits.

References Cited in the file of this patent

UNITED STATES PATENTS

| | | |
|---|---|---|
| 2,468,609 | Whitehouse | Apr. 26, 1949 |
| 2,539,190 | Hibbard | Jan. 23, 1951 |
| 2,632,873 | Hibbard | Mar. 24, 1953 |
| 2,712,103 | Purifoy | June 28, 1955 |

FOREIGN PATENTS

| | | |
|---|---|---|
| 635,016 | Great Britain | Mar. 29, 1950 |